Nov. 17, 1959  G. V. WOODLING  2,913,553
OFFSET SWIVEL TUBE COUPLING CONNECTOR BODY
Original Filed Feb. 2, 1951

INVENTOR.
George V. Woodling.

United States Patent Office 2,913,553
Patented Nov. 17, 1959

2,913,553

OFFSET SWIVEL TUBE COUPLING CONNECTOR BODY

George V. Woodling, Cleveland, Ohio

Continuation of application Serial No. 209,022, February 2, 1951. This application November 10, 1958, Serial No. 772,985

3 Claims. (Cl. 285—31)

This invention relates in general to tube couplings and more particularly to tube couplings having an offset connector body and a swivel connection.

This application is a continuation of my application, Serial No. 209,022, filed February 2, 1951 for Offset Swivel Tube Coupling Connector Body.

Commercial tube couplings are generally of two types: (1) the flare type and (2) the no-flare type. This invention is applicable to both types of fittings and particularly to the no-flare type.

The problem which the present invention solves is to enable a straight run tube to be mounted directly between two fixedly spaced hydraulic tube fittings having tube connection means facing each other, without dismantling the various parts of the fluid or hydraulic installation.

With T and elbow fittings of the flare type, it is possible to mount a straight run tube directly between the flared noses or facing ends of the swinging arms of fittings without using the present invention, although the use of the present invention greatly facilitates such mounting. In mounting a straight run tube between the flared noses or facing ends of the swinging arms of two fixedly spaced T or elbow fittings of the flare type, the practice involves the steps of: First, substantially completely turning the threadable rotating arms of the tube fittings into their respective threaded ports, arresting rotation of the swing arms of the two fittings at an interim location substantially 30 to 45 degrees in advance of the final or completed stopping place where the two swinging arms are in straight alignment with each other. Secondly, flaring the two ends of the straight run tube and inserting these two flare ends of the tube upon the flared noses or facing ends of the swinging arms of the connector bodies. Thirdly, finishing the turning of the two fittings until the swinging arms thereof are in straight alignment with each other with the flared noses or facing ends fitting well into the flared ends of the tube.

After the third operation, the ends of the flared tube are sealingly anchored to the flared noses of the aligned swinging arms by means of a suitable anchoring nut or sleeve combination. In mounting a straight run tube between two fixedly spaced T and elbow fittings of the flare type, it is extremely essential that the tube be of the exact length so as to enable the flared ends to be sealingly connected to the flared noses of the connector bodies.

With T and elbow fittings of the no-flare type, it is impossible to mount a straight run tube directly between the facing end of the swinging arms without using the present invention or an equivalent thereof. Thus, in the present application, my invention will be illustrated in connection with no-flare fittings, although it is to be understood that the present invention finds great utility with flare fittings. The reason that a straight run tube cannot be mounted directly between the facing ends of the swinging arms of two fixedly spaced no-flare fittings is that the ends of the tube must be inserted into the internal bores of the swinging arms of the connector bodies for a short distance, usually in the neighborhood of from ⅜ of an inch to ½ inch or more. Thus, a situation is created where the straight run tube which is mounted between the facing ends of the swinging arms of two fixedly spaced no-flare fittings must be longer than the distance between the facing ends of the swinging arms of the connector bodies. The only way in which a tube may be mounted between the facing ends of the swinging arms of two fixedly spaced non-flare fittings in the absence of the present invention, is for the installation man to dismantle the various parts of the fluid or hydraulic system so that the straight run tube may be mounted between the dismantled parts after which the various parts are re-assembled. In the trade, no-flare fittings are being gradually accepted as a new trend and are rapidly replacing the flare type fittings. However, the ready acceptance of no-flare fittings have been held back by reason of the fact that a straight run tube cannot be directly mounted between the facing ends of the swinging arms of two fixedly spaced fittings unless the installation man dismantles various parts of the equipment in order to enable the tube to be inserted into the bores of the no-flare fittings.

Therefore, an object of the present invention is the provision of enabling the installation man to readily mount a straight run tube directly between the facing ends of the swinging arms of two fixedly spaced T or elbow fittings either of the flare or no-flare type, and particularly of the no-flare type.

Another object of the invention is the provision of an offset T or elbow fitting which enables the installation man to easily mount a straight run tube therebetween.

Another object of the present invention is the provision of a connector body coupling having an offset intermediate portion, so that the axis of the bore of the swinging arm of the fitting in which the tube is inserted is in a different plane from the axis of the bore of the threadable rotating arm of the fitting which threadably fits into a threaded port of the various parts of the hydraulic equipment.

Another object of the invention is the provision of a connector body coupling having an offset intermediate portion with a swinging arm and a rotating arm extending respectively from first and second sides of the intermediate portion and with the external surface of the swinging arm of the fitting generated about an axis lying in a plane different from the plane in which the axis about which the external surface of the rotating arm of the fitting is generated.

Another object of the invention is the provision of mounting a straight run tube directly between the facing ends of the swinging arms of two fixedly spaced fittings, whereby the tube itself is disposed at a diagonal angle with respect to a straight line passing directly between the axes of the threaded ports into which the threadable rotating arms of tube fittings are anchored.

Another object of the invention is to permit the offset coupling bodies to freely turn and relieve the straight run tube from mechanical pull as the connecting nuts are tightened to press the contractible sleeves into the entrance camming surfaces of the swinging arms of the couplings.

Another object of the invention is the provision of making an offset connector body coupling by first providing a bore in one of the arms of the coupling and then bending the bored arm in order to provide the offset relationship between the two arms of the fitting body.

Other objects and a fuller understanding of the invention may be had by referring to the following description and claims, taken in conjunction with the accompanying drawing, in which:

Figure 1:
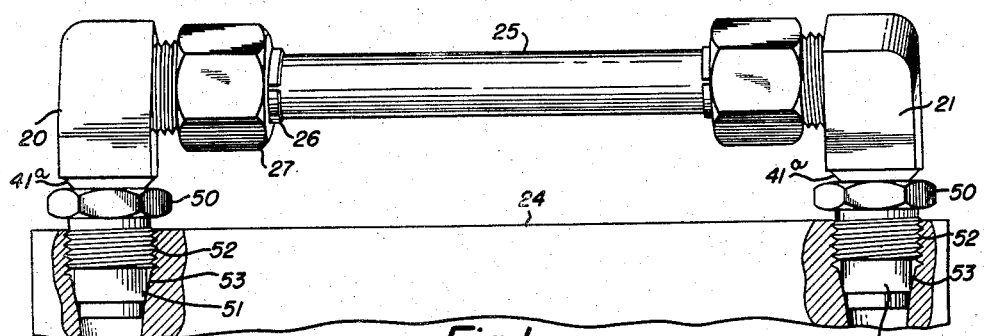
Figure 1 is a side view of two fixedly spaced connector body couplings embodying the preferable features of my invention with a straight run tube mounted therebetween.

With reference to the drawing, I illustrate two fixedly spaced offset connector body couplings 20 and 21 which are swivelably and threadably connected respectively to two spaced threaded ports 22 and 23. The threaded ports 22 and 23 are illustrative and may be any two threadable spaced ports in a hydraulic unit such as a valve, cylinder or pump or any two threadable spaced ports in a hydraulic panel 24 upon which the hydraulic units are replaceably mounted. In any event, the spaced distance between the two threaded ports 22 and 23 are fixed. The two offset connector body couplings 21 and 22 are interconnected by a straight run tube 25 having its opposite ends respectively connected to the two offset connector body couplings 20 and 21 by means of a sleeve 26 and a nut 27.

Figure 5:
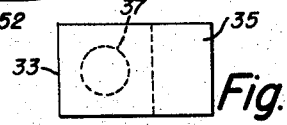
Figure 5 is a plan view of the blank connector body shown in Figure 3.
Figure 4:
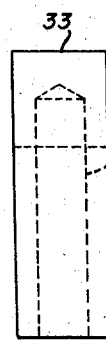
Figure 4 is a rear view of the blank connector body shown in Figure 3.
Figure 3:
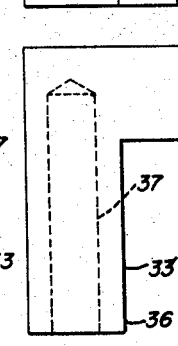
Figure 3 is a side view of a blank connector body or block from which a T fitting is manufactured, showing the bore in the rotating arm of the fitting.
Figure 6:
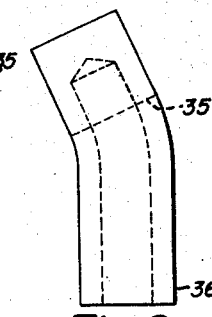
Figure 6 is a view similar to Figure 4, showing a rear view of the connector body after the rotating arm has been bent.
Figure 7:
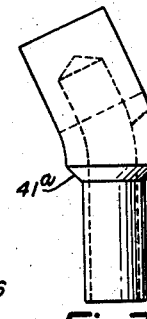
Figure 7 is a view similar to Figure 6, but showing the connector body after the lower end of the external surface of the rotating arm has been machined to a tubular body or extension.
Figure 8:
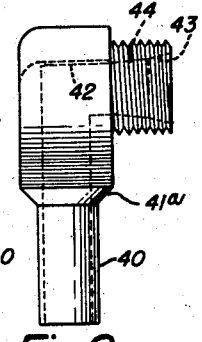
Figure 8 is a side view of the finished offset connector body with the swinging arm externally threaded and internally bored.

The two offset connector body couplings 20 and 21 are identical and the manner in which they are manufactured is shown in Figures 3 to 8, inclusive. The Figures 3, 4, and 5 show respectively front, rear and top views of an L-shaped blank or block 33 from which the offset connector body coupling is made. As illustrated, the L-shaped blank or block 33 comprises an intermediate portion 34, a swinging or first arm 35 and a rotating or second arm 36. The two arms 35 and 36 are indisposed substantially at right angles to each other, making an elbow fitting. A longitudinal bore 37 is provided in the rotating arm 36. After the bore 37 is provided in the blank or block 33, the rotating arm 36 is bent as shown in Figure 6. After this operation, the bent L-shaped blank or block 33 is chucked in a turret lathe or other machine and the external surface of the lower end of the rotating arm 36 is machined into a tubular body or extension 40, leaving a tapered shoulder 41 at the junction with the intermediate portion 34 of the block. At the completion of the forming of the tubular extension 40, the L-shaped block is re-chucked in the machine and the outer surface of the swinging arm 35 is shaped round after which machine threads 41 are provided thereon. Also while the L-shaped block remains chucked in the machine, the swinging arm 35 is provided with a bore 42 which communicates with the bore 37 in the rotating arm 36 to provide a passageway through the fitting. The bore 42 has an enlarged entrance camming surface 43 and a conical wedging surface 44. As shown in Figure 8, the machine threads 41 are generated about an axis extending laterally of or perpendicular to the right-hand side of the intermediate portion 34 of the coupling and the external surface of the tubular extension 40 is generated about an axis extending vertically of or at a right angle to the axis of the machine threads. The two axes about which the machine threads 41 and the tubular extension 40 are generated are disposed substantially at right angles to each other but each lie in a plane which is spaced from each other by an amount equal to the offset resulting from bending the rotating arm 36. The bore 42 including the entrance camming surface 43 and the conical wedging surface 44 have an axis substantially coinciding with the axis about which the machine threads 41 are generated. The lower portion of the bore 37 within the tubular extension 40 of the rotating arm 36 has an axis which coincides substantially with the axis upon which the tubular extension 40 is generated. The entrance camming surface 43 makes an angle approximately 10 to 15 degrees with respect to the axis about which the machine threads 41 are generated and the conical wedging surface 44 makes an angle of approximately 3 to 6 degrees with respect to the axis about which the machine threads 41 are generated.

Figure 9:
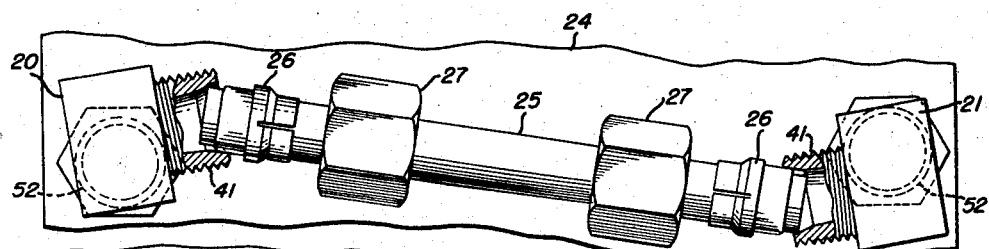
Figure 9 is a view showing the manner in which a straight run tube may be mounted or dismounted between the facing ends of the swinging arms of two fixedly spaced T fittings embodying the features of my invention.
Figure 10:
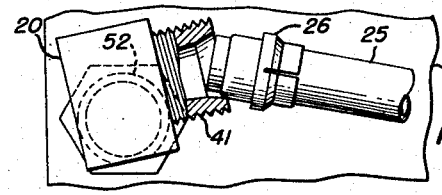
Figure 10 is a view of the offset connector body shown at the left-hand end of the tube in Figure 9, but disposed at a slightly different rotating angle.

In mounting a straight run tube 25 between the facing ends of the swinging arms 35 of the two spaced offset connector body couplings 20 and 21, the following practice is recommended. First, the tube fittings are substantially turned tight, but not completely, into their respective threaded ports, leaving the rotation of the swinging arm 35 positioned at an interim location substantially from 13 to 15 degrees in advance of the final or completed stopping place where the two swinging arms 35 are in straight alignment with each other. Such an interim position is shown in Figure 10. Secondly, the two ends of the straight run tube are respectively inserted in the entrance camming surfaces 43, after which the couplings are slightly rotated to hold the two ends of the tube in place. This is the position shown in Figure 10. The two sleeves 26 and the two nuts 27 were previously inserted over the tube prior to the insertion of the ends of the tube into the entrance camming surfaces 43. In Figure 9, the external surface of the sleeves 26 substantially are in alignment with the side wall of the entrance camming surface 43. Thirdly, the two fittings are finally turned to their stopping place into the threaded ports, being the place where the swinging arms 35 are in substantially straight alignment with each other. In this position, the ends of the straight run tube project well into the conical wedging surfaces 44 of the swinging arms. After the third operation, the ends of the straight run tube 25 are sealingly anchored to the swinging arms 35 by means of the sleeves 26 and the nuts 27, see Figure 2. The construction of the sleeves 26 and the nuts 27 may be of any suitable design and preferably may be the same as shown in my Patent No. 2,553,619, issued May 7, 1951, for Contractible Sleeve for Tube Fitting.

Figure 2:
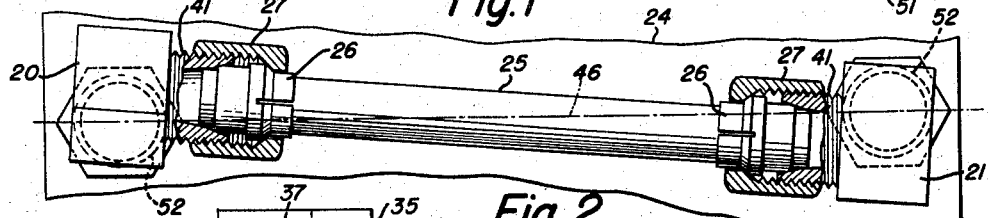
Figure 2 is a plan view of the fittings shown in Figure 1, with portions of the fittings shown in cross-section to illustrate the disposition of the connecting sleeve and nut which sealingly anchor the ends of the tubes to the inside of the swinging arms of the connector bodies.

The straight run tube 25 may be dismantled from the two offset connector body couplings in a reverse manner to that explained for the mounting of the tube between the fittings. The correct length of the tube is determined automatically, in that the tube is automatically of the right length to project well into the conical wedging surfaces 44, if the ends just clear the facing ends of the swinging arms as shown in Figure 10. Thus, when the swinging arms are swung around to their final stopping or assembled places, the ends of the tube wedgingly fit within the conical wedging surface 44 as shown in Figure 2. By reason of the offset construction, the swinging arms, as they are swung around, toward their assembly position, describe a compound movement; in that, one movement comprises the swinging arms longitudinally moving toward each other, and the other movement comprises the swinging arms moving in a circle. The same compound movement is effected upon disassembly, except that the swinging arms longitudinally move away from each other. The amount of the longitudinal movement depends upon the extent that the rotating arm 36 is bent. It is the movement effected by the offset that enables a straight run tube to be connected between the facing ends of the swinging arms of two fixedly spaced fittings, even though the tube is longer than the distance between the facing ends of the two spaced swinging arms in their assembled position. Therefore, with the present invention, it is possible to mount a straight run tube directly between two connector bodies which are fixedly spaced with respect to each other.

The offset connector bodies are preferably swivelably connected to the threaded ports 22 and 23, so that they may freely turn and relieve the straight run tube from mechanical pull as the nuts 27 are tightened. The swivel connections each preferably comprises a sleeve nut 50 which turnably surrounds the tubular extension 40 and sealingly anchors same into the threaded port. The sleeve nut 50 comprises a contractible ring portion 51 and a threaded portion 52. The contractible ring portion 51 is adapted to hit or contractibly engage the tubular extension 40 as it is cammed into a camming surface 53 being substantially identical to the entrance camming surface 43 in the swinging arms of the offset couplings. The threaded portion 52 comprises machine threads which are adapted to force the contractible ring portion 51 into the camming surface 53 of a threaded port.

In assembly, the threaded portions 51 of the sleeve nus 50 are substantially turned tight but not completely, into their threaded ports, leaving the tubular extensions 40 of the rotating arms 36 free to turn. That is to say, the sleeve nuts 50 have not as yet been finally set. With the tubular extensions of the rotating arms 40 free to turn, the nuts 27 are turned tight, driving the sleeves 26 into the entrance camming surfaces 43 and causing the foward ends of the sleeves 26 to bite or contractibly engage the ends of the tube 25. As the sleeves 26 bite into the ends of the tube 25, the offset connector bodies are free to turn, allowing the sleeves 26 and the nuts 27 to freely draw the ends of the tube 25 wedgingly into the conical wedging surfaces 44 of the swinging arms, without imposing too much longitudinal pull on the tube 25. The sleeve nuts 50 are now ready to be turned completely tight into the threaded ports. Upon turning the sleeve nuts 50 completely tight, the tubular extensions 40 of the rotating arms are swively set, perfecting fluid tight seals between the threaded ports and the rotating arms of the offset connector bodies. Upon setting each of the sleeve nuts 50 tight, the contractible ring portion 51, upon contractibly biting or engaging the tubular extension 40, operates to draw the tapered shoulder 41 into the top end of the sleeve nut to make a rigid mechanical interfitting engagement therebetween.

While the invention is illustrated as being applied to no-flare fittings, it is obvious that the same invention applies equally well to facilitate the mounting of a straight run tube having flared ends between two flare type fittings.

In the final assembly of the tube 25 as shown in Figure 2, the longitudinal axis of the tube 25 is disposed diagonally with respect to a straight line 46 passing directly between the axes of the threaded ports 22 and 23. In Figure 2 this angle is approximately 5 degrees, although it may vary depending upon the amount of the offset. One benefit arising from the fact that the tube 25 is diagonally disposed with respect to the straight line 46 is that the tube and the two offset couplings do not operate as a perpendicular column as viewed from the axes of the two thread ports 22 and 23. Mechanical strains which are imposed on the tube in the direction of the straight line 46 are allowed to be relieved by the tube slightly buckling, since the tube does not function as a perpendicular column.

The swivel connections of the tubular extensions 40 of the rotating arms to the threaded ports 22 and 23 enable the entire combination of the two connector body couplings 20 and 21 and the tube 25 to be mounted or dismounted as an assembled unit. The assembled unit may be mounted in the threaded ports 22 and 23 by merely screwing the sleeve nuts 50 into the threaded ports. In removing the assembled unit, it is only necessary to unscrew the sleeve nuts 50. The offset connector bodies in combination with the swivel connections enables the assemblyman to more readily align the sleeve nuts 50 into the threaded ports 22 and 23, since slight variations in the length of the tube 25 may be compensated for by swingably adjusting the position of the offset connector bodies which varies the longitudinal length between the facing ends of the swinging arms.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A tube connection comprising an offset coupling member, a tubular member having a tubular end section mounted in said coupling member, said offset coupling member comprising a hollow body having an intermediate portion with at least first and second end portions fixedly extending, respectively, from first and second sides of the intermediate portion at substantially a right angle with respect to each other, said intermediate portion and said first and second end portions being fixedly connected together and comprising a unitary member, said first end portion comprising a first hollow arm having a coupling surface generated about an axis fixedly extending in a first direction from said first side of the intermediate portion of the hollow body, said second end portion comprising a second hollow arm having a coupling surface generated about an axis fixedly extending in a second direction from said second side of the intermediate portion of the hollow body, swivel means engaging said coupling surface of said second end portion and connecting said second end portion to a connection body, said first and second end portions being fixedly offset relative to each other with the generating axis of the first end portion lying in a first plane fixedly spaced from and parallel to a second plane in which the generating axis of the second end portion lies, means fixedly mounting said tubular member with respect to said connection body in the direction of the longitudinal axis of said tubular member and with the axis of the tubular end section thereof substantially in alignment with the generating axis of said first end portion, said first end portion having a bore including an internal conical annular camming surface with an axis substantially coinciding with the axis of said tubular end section to telescopically project over and around said fixedly mounted tubular end section, rotation of said second end portion of said coupling member in said swivel means swingably actuating said first end portion with said bore therein toward said fixedly mounted tubular end section thereby telescopically moving said internal conical annular camming surface over and around said fixedly mounted tubular end section, said second end portion and said intermediate portion having a passageway extending from said second plane to said first plane and communicating with the bore of the first end portion for providing a continuous and closed passageway therethrough, said generating axes of the first and second end portions being angularly and fixedly disposed with respect to each other, a contractible sleeve surrounding said fixedly mounted tubular end section, and means engaging said first end portion and said sleeve to press said contractible sleeve into said internal conical annular camming surface and thereby contract said sleeve about said fixedly mounted tubular end section.

2. Fluid conduit interconnection means between first and second fixedly spaced ports, said conduit means including first and second coupling members and a tube therebetween having first and second tubular end sections, said first coupling member mounted in said first port, said second coupling member comprising an offset hollow body having an intermediate portion with at least first and second end portions fixedly extending respectively from first and second sides of the intermediate portion at substantially a right angle with respect to each other, said intermediate portion and said first and second end portions being fixedly connected together and comprising a unitary member, said first end portion comprising a first hollow arm having a coupling surface generated about an axis fixedly extending in a first direction from said first side of the intermediate portion of the hollow body, said second end portion comprising a second hollow arm having a coupling surface generated about an axis fixedly extending in a second direction from said second side of the intermediate portion of the hollow body, swivel means engaging said coupling surface of said second end portion and connecting said second end portion to said second port, said first and second end portions being fixedly offset relative to each other with the generating axis of the first end portion lying in a first plane fixedly spaced from and parallel to a second plane in which the generating axis of the second end portion lies, means connecting said first tubular end section to said first coupling member with the second tubular end section of the tube fixedly mounted with respect to the second port in the direction of the longitudinal axis of said tube and with the axis of said second tubular end section lying substantially in alignment with the generating axis of said first end portion, said first end portion having a bore including an internal conical annular camming surface with an axis substantially coinciding with the axis of the second tubular end section to make a telescopic engagement over and around said second tubular end section, rotation of said second end portion of said second coupling member in said swivel means swingably actuating said conical annular camming surface of said first end portion toward said fixedly mounted second tubular end section to make a telescopic engagement therewith, said second end portion and said intermediate portion having a passageway extending from said second plane to said first plane and communicating with the bore of the first end portion for providing a continuous and closed passageway therethrough, said generating axes of the first and second end portions being angularly and fixedly disposed with respect to each other, a contractible sleeve surrounding said second tubular end section, and means engaging said first end portion and said sleeve to press said contractible sleeve into said internal conical annular camming surface and thereby contract said sleeve about said second tubular end section.

3. Fluid conduit interconnection means between first and second fixedly spaced ports, said conduit means including first and second coupling members and a tube therebetween having first and second tubular end sections, said first coupling member mounted in said first port, said second coupling member comprising an offset hollow body having an intermediate portion with at least first and second end portions fixedly extending respectively from first and second sides of the intermediate portion at substantially a right angle with respect to each other, said intermediate portion and said first and second end portions being fixedly connected together and comprising a unitary member, said first end portion comprising a first hollow arm having a coupling surface generated about an axis fixedly extending in a first direction from said first side of the intermediate portion of the hollow body, said second end portion comprising a second hollow arm having a coupling surface generated about an axis fixedly extending in a second direction from said second side of the intermediate portion of the hollow body, swivel means engaging said coupling surface of said second end portion and connecting said second end portion to said second port, said first and second end portions being fixedly offset relative to each other with the generating axis of the first end portion lying in a first plane fixedly spaced from and parallel to a second plane in which the generating axis of the second end portion lies, means connecting said first tubular end section to said first coupling member with the second tubular end section of the tube fixedly mounted with respect to the second port in the direction of the longitudinal axis of said tube and with the axis of said second tubular end section lying substantially in alignment with the generating axis of said first end portion, said first end portion having a conical surface with an axis substantially coinciding with the axis of the second tubular end section to make a telescopic engagement with said second tubular end section, rotation of said second end portion of said second coupling member in said swivel means swingably actuating said conical surface of said first end portion toward said fixedly mounted second tubular end section to make a telescopic engagement therewith, said second end portion and said intermediate portion having a passageway extending from said second plane to said first plane and communicating with the bore of the first end portion for providing a continuous and closed passageway therethrough, said generating axes of the first and second end portions being angularly and fixedly disposed with respect to each other, a sleeve surrounding said second tubular end section, and means engaging said first end portion and said sleeve to move said sleeve toward said conical surface and thereby press said sleeve against said second tubular end section engaging said conical surface.

References Cited in the file of this patent

UNITED STATES PATENTS

| | | |
|---|---|---|
| 232,495 | Hayes | Sept. 21, 1880 |
| 868,377 | Wands | Oct. 15, 1907 |
| 980,939 | Glauber | Jan. 10, 1911 |
| 1,143,816 | Duffy | June 22, 1915 |
| 1,615,204 | Huyette | Jan. 18, 1927 |
| 2,175,456 | Couty | Oct. 10, 1939 |
| 2,489,660 | Mueller | Nov. 29, 1949 |
| 2,657,077 | Woodling | Oct. 27, 1953 |